…

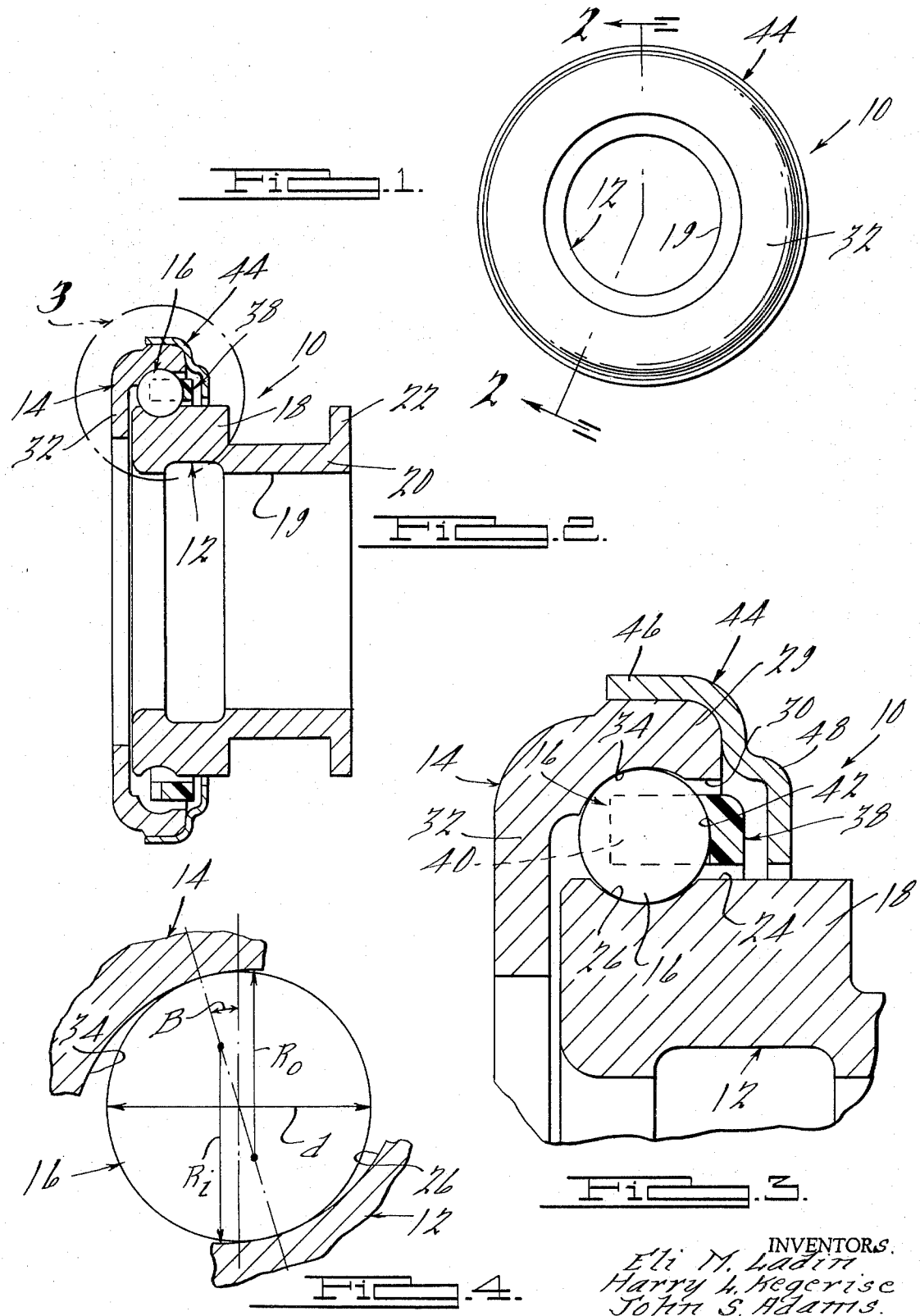

United States Patent Office 3,674,357
Patented July 4, 1972

3,674,357
CLUTCH RELEASE BEARING
Eli M. Ladin, Ann Arbor, Harry L. Kegerise, Troy, and John S. Adams, Birmingham, Mich., assignors to Federal-Mogul Corporation, Southfield, Mich.
Filed Mar. 30, 1971, Ser. No. 129,520
Int. Cl. F16c *19/10*
U.S. Cl. 308—233                             6 Claims

ABSTRACT OF THE DISCLOSURE

A clutch release bearing assembly comprising a plurality of spherical anti-friction bearing elements adapted for engagement with semi-spherical raceways in cooperative inner and outer bearing race members, the dimensions of the raceways being of a predetermined relationship with respect to the dimension of the bearing elements.

SUMMARY OF THE INVENTION

The present invention is directed toward a new and improved clutch release bearing assembly which is intended to overcome an objectionable manufacturing problem encountered in connection with the manufacture and assembly of prior known clutch release bearings wherein it was necessary to match-mate associated bearing race members of varying dimensional tolerances in order to assure that the completed bearing assemblies would have the requisite operational characteristics, i.e., low friction, low noise, etc. The procedure of match-mating bearing races has been necessitated due to the existing tolerance capabilities or capacity of present day machine tools and has been time consuming, has resulted in unnecessary inventory problems, and has otherwise needlessly added to the overall manufacturing expenses of prior known clutch release bearing assemblies. It is accordingly a general object of the present invention to provide a new and improved clutch release bearing assembly which obviates the need for such match-mate selection of associated bearing components.

It is a more particular object of the present invention to provide a new and improved clutch release bearing assembly wherein the dimensions of the semi-spherical raceways of the bearing races, with which the spherical anti-friction bearing elements are engaged, are selected as a predetermined ratio or percentage of the dimension of the bearing element themselves.

It is another object of the present invention to provide a new and improved clutch release bearing assembly that features a predetermined contact angle which assures that the contact area between the bearing elements and the associated race members does not extend out of or over the edges of the bearing raceways.

It is yet another object of the present invention to provide a new and improved clutch release bearing assembly which is of a simple design, is easy to assemble and economical to manufacture.

Various other objects and advantages of the present invention will be readily apparent from the following detailed description when considered in connection with the accompanying drawing.

BRIEF DESCRIPTION OF THE DRAWING

FIG. 1 is a side elevational view of the clutch release bearing assembly of the present invention;

FIG. 2 is an enlarged cross-sectional view taken substantially along the line 2—2 of FIG. 1;

FIG. 3 is an enlarged fragmentary cross-sectional view of a portion of the bearing structure illustrated within the circle 3 of FIG. 2, and FIG. 4 is an enlarged diagrammatic view of the bearing structure shown in FIG. 3 and illustrates the contact angle which exists between the bearing elements and race members upon axial loading of the assembly.

DETAILED DESCRIPTION OF THE PREFERRED EMBODIMENT

Referring now in detail to the drawing and in particular to FIGS. 1 and 2, a clutch release bearing asseembly 10, in accordance with a preferred embodiment of the present invention, is shown generally as comprising an inner race member 12, an outer race member 14, and a plurality of spherical, anti-friction bearing elements 16 interposed between and engageable with the race members 12 and 14 and providing for relatively friction-free rotation therebetween.

The inner race member 12 generally comprises an annular body section 18 defining an axially extending bore 19. Formed integrally of the body section 18 and extending axially outwardly therefrom is an annular mounting section 20, which terminates at the axially outer end thereof in a radially outwardly disposed flange or shoulder portion 22 and is adapted to be secured in a manner well known in the art to an associated support structure, operating mechanism, etc. The outer periphery of the main body section 18 of the inner race member 12 comprises an annular section 24 which is formed with a radially inwardly extending annular raceway 26. As illustrated in the drawing, the raceway 26 is semi-circular in cross-section and is defined by radius $R_1$.

With reference to the outer race member 14, as best seen in FIGS. 2 and 3, the member 14 comprises a generally axially extending annular section 29 having an inner peripheral portion 30 arranged in confronting relation with respect to the aforedescribed section 24 on the inner race member 12. The outer race member 14 also comprises an integral, generally radially disposed flange section 32 which extends radially inwardly adjacent the axial end of the race member 12 opposite the mounting section 20 thereof. The race portion 30 is formed with a radially outwardly extending raceway 34 which is radially aligned with the raceway 26. The raceway 34, like the aforementioned raceway 26, is semi-circular in cross-section and is defined by a radius $R_o$. As illustrated in the drawing and as will be appreciated by those skilled in the art, the anti-friction bearing elements 16 comprise highly precision spherical or ball members of uniform diameter $d$ and fabricated, for example, of a suitable high strength metal alloy, and each of the elements 16 is adapted to be operatively engaged with raceways 26, 34 formed in the members 12, 14, respectively, and thereby provide for relatively free rotational movement therebetween.

As is conventional in the art, the bearing assembly 10 is preferably provided with a suitable bearing cage for retaining the bearing elements 16 in circumferentially spaced relation with one another. An exemplary embodiment of such a bearing cage is illustrated herein and is generally designated by the numeral 38, the cage preferably being fabricated of plastic or the like and being formed with a plurality of circumferentially spaced, axially extending retaining finger sections 40 defining bearing receiving recesses 42 therebetween. As is also conventional in the art, the bearing assembly 10 is preferably provided with a suitable enclosure or housing, representatively designated in the drawing by the numeral 44 and comprising a generally axially extending section 46 arranged around the outer periphery of the outer race section 29, the housing 44 also comprising an integral, generally step-shaped radially inwardly disposed annular section 48 arranged adjacent the bearing cage 38 and adapted to function in a conventional manner in preventing the ingress of dirt, moisture, and other foreign material into the interior of the assembly 10, and/or provide for the retention of a suitable lubricant, such as grease or the like, interiorly thereof.

It has heretofore been the practice in the manufacture of clutch release bearings, such as the bearing 10, particularly in such bearings having a ball pitch diameter of between 1 and 4 inches, to have tolerance variations in the dimensions of the inner and outer race members thereof resulting in an overall radial clearance between the race members and bearing elements of between .0006 and .0026 inch, this being the result of the accuracy of the machine tools which are commercially available for use in fabricating the race members. Because of such tolerance variations it has been necessary to match-mate the inner and outer race members of each bearing assembly in order to assure that minimum operational standards are obtained, i.e., to assure that minimum noise sensitivity is not exceeded, and to assure that the contact areas between the spherical bearing elements and the associated bearing races do not extend over the edges of the raceways with which the bearing elements are operatively engaged. Such match-mating has, of course, been objectionable since it has been time consuming and has resulted in unnecessary component handling and related inventory problems, and the like.

In accordance with the principles of the present invention, it has been found that when the dimensions of the raceways 26 and 34 on the inner and outer race members 12 and 14, respectively, are selected so as to be of a predetermined relation with respect to the diameter of the anti-friction bearing elements 16, the desired operational characteristics of the clutch release bearing assembly 10 are achieved without the need for match-mating the inner and outer race members 12 and 14, thereby obviating the aforedescribed manufacturing problems resulting from such component selection procedures. More particularly, it has been discovered that when the radius $R_o$ defining the raceways 34 on the outer race member 14 is between 53.1 and 53.9% of the diameter $d$ of the bearing element 16, and the radius $R_i$ of the raceways 26 of the inner race member 12 is between 52.1 and 52.9% of the diameter $d$ of the bearing elements 16, the bearing assembly 10 may be manufactured and assembled under the aforementioned tolerance variations which exist in commercially available machine tools without requiring any match-mating of race members 12, 14 thereof, and that in addition, both the noise sensitivity and low friction characteristics of the assembly 10 are improved. That is, when the dimensions of the raceways 34 and 26 are selected so as to be within the above ranges, the need for match-mating the inner and outer race members 12 and 14 is not only obviated, but the overall operational characteristics of the bearing assembly 10 are improved. It will be noted that while the selection of the radii of the raceways 26 and 34 may fall anywhere within the aforesaid ranges in order to achieve the new and improved results of the present invention, it has been found preferable to have the radius $R_i$ of the raceways 26 approximately 52.5% of the diameter $d$ of the bearing elements 16, plus or minus .001 inch, and to have the radius $R_o$ of the raceways 34 approximately 53.5% of the diameter $d$ of the bearing elements 16, plus or minus .001 inch. It will be appreciated, of course, that while the above dimensional relationships have been found to be highly preferable, the present invention is not intended to in any way be limited to these specific relationships.

It may be noted that when the bearing assembly 10 is designed in accordance with the above disclosed dimensional relationships between the radii $R_i$ and $R_o$ of the raceways 26 and 34 and the diameter $d$ of the plurality of anti-friction bearing elements 16, the contact angle of B of the bearing assembly 10 will range from anywhere from between 12.33 degress to 22.55 degrees, and will preferably be in the order of approximately 17 degrees. As best illustrated in FIG. 4, the contact angle B is defined as the angle between a plane extending perpendicular to the rotational axis of the bearing assembly 10 and extending through the center of the bearing elements 16, and a line extending diametrically through one of the elements 16 and connecting the points of contact between the periphery thereof and the semi-circular raceways 26, 34, respectively. It will be appreciated by those skilled in the art that it is important in a clutch release bearing assembly of the above described type that the contact angle, as defined above, be small enough so that the contact areas between the element 16 and race members 12, 14 does not extend over the outer peripheral edges of the respective raceways 26 and 34, since this would result in excessive wear and undesirable frictional characteristics. By selecting the radii $R_i$ and $R_o$ so as to fall within the above defined ranges of dimensions with respect to the diameter $d$ of the bearing elements 16, the contact angle will always be sufficiently small to assure that the contact area between the elements 16 and race members 12 and 14 does not extend out of the raceways 26, 34, thereby assuring that the bearing assembly 10 will have a long and effective operational life.

It will be seen from the foregoing that the present invention provides a novel clutch release bearing assembly which will have improved noise sensitivity and anti-friction characteristics. In addition, the clutch release bearing assembly of the present invention will be found to completely obviate the heretofore objectionable manufacturing procedure of match-mating associated bearing races, with the result that such bearing races may be randomly selected for purposes of assembly without the need for prior measurement, sorting, and other time consuming and expensive handling procedures, whereby to provide for a new and improved bearing assembly which will have improved operational characteristics and that may be economically manufactured and assembled.

While it will be apparent that the preferred embodiment illustrated herein is well calculated to fulfill the objects above stated, it will be appreciated that the present invention is susceptible to modification, variation and change without departing from the scope of the invention.

We claim:
1. In a clutch release bearing assembly,
   a first annular race member having means defining a first raceway thereon,
   a second annular race member having means defining a second raceway thereon,
   a plurality of generally spherical anti-friction bearing elements interposed between said first and second raceways,
   said first raceway being generally semi-circular in cross section and defined in part by a radius R equal to between 52.1 and 52.9% of the diameter of said bearing elements,
   said second raceway being generally semi-circular in cross section and defined in part by a radius R equal to between 53.1 and 53.9% of the diameter of said bearing elements.

2. In a clutch release bearing assembly,
   inner and outer race members having confronting first and second raceways,
   a plurality of spherical anti-friction bearing elements interposed between said race members and each received in part within said raceways,
   said first raceway being generally semi-circular in cross section and defined by a radius, the dimension of which is between 52.1 and 52.0% of the daimeter of said anti-friction elements, and said second raceway being generally semi-circular in cross section and defined by a radius, the dimension of which is between 53.1 and 53.9% of the diameter of said anti-friction elements,
   whereby said inner and outer race members may be randomly selected from a plurality thereof and may be operatively assembled without the need for matchmating certain of said plurality of members in order to compensate for tolerance variation in the manufacture thereof.

3. A clutch release bearing assembly as set forth in claim 2 wherein the radius dimension defining said first raceway is approximately 52.5% of the diameter of said anti-friction elements, and wherein the radius dimension defining said second raceway is approximately 53.5% of the diameter of said anti-friction elements.

4. In a clutch release bearing assembly having a ball pitch diameter between approximately one (1.00) and four (4.00) inches, an outer race member defining a first raceway around an inner peripheral portion thereof,
an inner race member defining a second raceway around an outer peripheral portion thereof,
a plurality of circumferentially spaced generally spherically shaped anti-friction bearing elements interposed between said race members and adapted for engagement with said raceways,
said bearing elements being of a predetermined substantially uniform diameter $d$,
said first raceway being in part defined by a radial dimension equal to approximately 53.5% $d$, and said second raceway being in part defined by a radial dimension equal to approximately 52.5% $d$.

5. A clutch release bearing assembly as set forth in claim 4 wherein the angle of contact between a plane extending perpendicular to the rotational axis of the assembly and extending through the center of said elements, and a line extending diametrically through one of said elements and connecting the points of contact between the periphery thereof and said raceways on said inner and outer race members is between approximately 12 degrees and 22 degrees.

6. A clutch release bearing assembly as set forth in claim 5 wherein said contact angle is approximately 17 degrees.

References Cited

UNITED STATES PATENTS 2,785,023  3/1957  Noumann ---------- 308—233

MARTIN P. SCHWADRON, Primary Examiner

F. SUSKO, Assistant Examiner